US008822845B2

(12) United States Patent
Lamprecht et al.

(10) Patent No.: US 8,822,845 B2
(45) Date of Patent: Sep. 2, 2014

(54) CABLE SLEEVE FOR A HAND-HELD POWER TOOL

(75) Inventors: Justus Lamprecht, Dusslingen (DE); Sinisa Andrasic, Schoenaich (DE); Marcus Schuller, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 567 days.

(21) Appl. No.: 13/000,694

(22) PCT Filed: Apr. 24, 2009

(86) PCT No.: PCT/EP2009/054965
§ 371 (c)(1), (2), (4) Date: Dec. 22, 2010

(87) PCT Pub. No.: WO2009/156206
PCT Pub. Date: Dec. 30, 2009

(65) Prior Publication Data
US 2011/0100708 A1 May 5, 2011

(30) Foreign Application Priority Data
Jun. 24, 2008 (DE) ........................ 10 2008 002 616

(51) Int. Cl.
*H01R 13/58* (2006.01)
*H02G 15/00* (2006.01)
*H02G 15/013* (2006.01)

(52) U.S. Cl.
USPC ............................ 174/650; 174/668; 439/449

(58) Field of Classification Search
USPC .................................. 174/650, 668; 439/449
See application file for complete search history.

(56) References Cited

U.S. PATENT DOCUMENTS

| | | | | | |
|---|---|---|---|---|---|
| 1,218,216 | A | * | 3/1917 | Schmid, Jr. | 174/84 S |
| 1,912,115 | A | * | 5/1933 | Allen | 174/46 |
| 2,386,000 | A | * | 10/1945 | McQuiston | 439/447 |
| 3,499,097 | A | * | 3/1970 | Widstrand | 174/660 |
| 3,744,008 | A | * | 7/1973 | Castellani | 248/56 |
| 3,946,144 | A | * | 3/1976 | Quante | 174/92 |
| 4,002,818 | A | * | 1/1977 | Kunze | 174/21 R |
| 4,033,535 | A | * | 7/1977 | Moran | 248/56 |
| 4,089,496 | A | * | 5/1978 | Mizusawa | 248/56 |
| 4,145,566 | A | * | 3/1979 | Weingartner | 174/653 |
| 4,157,799 | A | * | 6/1979 | Simon | 248/56 |
| 4,350,840 | A | * | 9/1982 | Michaels | 174/655 |
| 4,549,038 | A | * | 10/1985 | Masheris et al. | 174/655 |
| 4,640,479 | A | * | 2/1987 | Shely et al. | 248/56 |
| 4,686,738 | A | * | 8/1987 | Bladh | 174/152 G |

(Continued)

FOREIGN PATENT DOCUMENTS

| | | |
|---|---|---|
| CN | 2457845 Y | 10/2001 |
| CN | 1387286 A | 12/2002 |

(Continued)

*Primary Examiner* — Jeremy C Norris
*Assistant Examiner* — Nathan Milakovich
(74) *Attorney, Agent, or Firm* — Maginot, Moore & Beck

(57) ABSTRACT

The invention relates to a cable sleeve for guiding a cable in the inlet and outlet region of a hand-held tool. An end of the cable sleeve on the housing side is connected to the housing in a fixable manner, particularly in a form-fitting manner, so that advantageously no dust, dirt, or water may enter between the cable sleeve and the cable. According to the invention the cable sleeve has preferably a radial sealing element which corresponds to the cable and/or the housing in a sealing manner.

19 Claims, 5 Drawing Sheets

(56) References Cited

U.S. PATENT DOCUMENTS

| | | | | |
|---|---|---|---|---|
| 4,738,636 | A * | 4/1988 | Bolante | 439/462 |
| 5,371,821 | A * | 12/1994 | Szegda | 385/87 |
| 5,574,819 | A * | 11/1996 | Gunther et al. | 385/139 |
| 5,640,476 | A * | 6/1997 | Womack et al. | 385/86 |
| 5,773,758 | A * | 6/1998 | Coutureau et al. | 174/660 |
| 6,100,472 | A | 8/2000 | Foss | |
| 6,152,639 | A | 11/2000 | Hsu | |
| 6,274,812 | B1 * | 8/2001 | Daoud | 174/652 |
| 6,353,185 | B1 * | 3/2002 | Sakata | 174/668 |
| 6,608,254 | B1 * | 8/2003 | Bernollin et al. | 174/84 R |
| 6,672,894 | B2 * | 1/2004 | Sprunger | 439/449 |
| 6,822,165 | B2 * | 11/2004 | Nishimoto | 174/650 |
| 7,251,409 | B2 * | 7/2007 | Shakeri | 385/138 |
| 7,579,556 | B2 * | 8/2009 | Tapper | 174/650 |
| 7,579,557 | B2 * | 8/2009 | Tapper | 174/650 |
| 8,586,879 | B2 * | 11/2013 | Schadow et al. | 174/650 |
| 2002/0020543 | A1 * | 2/2002 | Krall | 174/65 G |
| 2004/0154819 | A1 * | 8/2004 | Sakata | 174/65 G |
| 2005/0226589 | A1 * | 10/2005 | Hafner et al. | 385/139 |
| 2012/0015555 | A1 * | 1/2012 | Deimel et al. | 439/607.41 |
| 2012/0231653 | A1 * | 9/2012 | Ardisana et al. | 439/449 |

FOREIGN PATENT DOCUMENTS

| | | | |
|---|---|---|---|
| CN | 201048268 | Y | 4/2008 |
| DE | 1290214 | B | 3/1969 |
| DE | 3114419 | A * | 10/1982 |
| DE | 3409906 | A1 * | 9/1985 |
| DE | 4134260 | A1 | 4/1993 |
| DE | 102010031304 | A1 * | 1/2012 |
| EP | 117092 | A * | 8/1984 |
| EP | 465261 | A2 * | 1/1992 |
| EP | 994544 | A1 * | 4/2000 |
| EP | 1359643 | A1 * | 11/2003 |
| EP | 1903226 | A2 * | 3/2008 |
| EP | 1 918 053 | A2 | 5/2008 |
| FR | 1450565 | A | 11/1966 |
| GB | 2056191 | A * | 3/1981 |
| GB | 2136220 | A | 9/1984 |
| GB | 2171855 | A * | 9/1986 |
| GB | 2268639 | A * | 1/1994 |
| SU | 1487116 | A * | 6/1989 |
| SU | 1492406 | A1 | 7/1989 |
| WO | 9424747 | A1 | 10/1994 |
| WO | WO 0139334 | A1 * | 5/2001 |

* cited by examiner

CABLE SLEEVE FOR A HAND-HELD POWER TOOL

CROSS-REFERENCE TO RELATED APPLICATION

This application is a 35 USC 371 application of PCT/EP 2009/054965 filed on Apr. 24, 2009.

BACKGROUND OF THE INVENTION

1. Field of the Invention

The present invention is based on a cable sleeve for guiding a cable in the inlet and outlet region of a hand-held tool.

2. Description of the Prior Art

Corded hand-held power tools can usually be connected to a power source by means of a cable. The cable is encompassed by an essentially coaxial cable sleeve at the cable outlet opening from the housing.

The cable sleeve assures a relatively low bending angle of the cable at the outlet opening of the housing under all operating conditions, thus preventing a sharp bending of the cable went corresponding forces are exerted on it. This protects the cable from being damaged by extreme bending and also from other mechanical influences in the region in which it is enclosed by the cable sleeve.

During operation of the hand-held power tool, the cooling air of the electric motor is usually drawn into the housing from the outside through inlet openings, travels past the motor, and is blown out again through outlet openings. As a result, negative pressure is produced in the housing, which causes air from the outside to flow into the housing through all existing openings and gaps in corresponding regions, including through the gap between the cable and cable sleeve. This gap is present due to the relatively high production tolerances of the cable and cable sleeve and due to the fact that only a few types of cable sleeve are used for a wide variety of cables of different external diameters that are required due to the various voltage systems worldwide. For this reason, it is currently necessary to stock a plurality of cable sleeve types with various inner diameters.

Air drawn in by means of the cable sleeve conveys dust particles from the work environment into the interior of the power tool. For example when using an angle grinder, these dust particles are frequently metallic and on the inside of the housing, can settle on switches or other electrical, voltage-carrying elements. As a result, the conductive metallic particles can form bridges between the different voltage potentials. Corresponding arcing can result in breakdowns of the hand-held power tool and can be hazardous to the user.

ADVANTAGES AND SUMMARY OF THE INVENTION

Depending on the embodiment of the external and/or internal shape of the cable sleeve, the invention can perform a sealing action and can provide tolerance compensation. It is therefore not necessary to use a specific cable sleeve type for each country-specific design of the hand-held power tool, thus reducing the number of parts required. In addition, due to its new embodiment, the cable sleeve can simultaneously function as a power cord strain-relief element.

Because the cable sleeve encompasses the cable in a radially sealed, frictional, nonpositive fashion, water, dust, and the like cannot penetrate into the interior of the housing, particularly because the end of the cable sleeve oriented toward the housing has a ring-like sealing element that rests in a sealed fashion against the outer circumference of the cable.

Because the cable sleeve is provided with a helical sealing lip that protrudes radially inward, the cable can be inserted axially into a narrow cable sleeve by turning it like a screw.

The sealing action is improved by virtue of the fact that the cable sleeve has a plurality of ring-like sealing elements at its end oriented toward the housing.

The sealing action can be improved and the manufacture of the cable sleeve can be simplified by virtue of the fact that the ring-like sealing elements are embodied in the form of annular beads, particularly in the form of injection-molded O-rings composed of a material that differs from the material of the sleeve, in particular has softer elastic properties than it.

The sealing action for particular circumstances and special applications can be improved by virtue of the fact that the ring-like sealing elements are embodied in the form of hollow cylindrical plugs, in particular wedge-shaped plugs, that protrude into the hollow cylinder of the cable sleeve, particularly at its front end.

Another easy-to-install sealing variant is achieved by virtue of the fact that a smooth, cylindrical, hollow connecting piece of the cable sleeve protrudes axially into the interior of the housing and in the installed position therein, is encompassed in a contracting fashion so that a region of the hollow connecting piece rests in an annular, sealed fashion against the outside of the cable.

It is also possible to use conventional cable sleeves in a sealed fashion by virtue of the fact that clamping jaw-like parts, in particular parts belonging to the housing, are able to act on the hollow connecting piece.

The sealing action can be improved with extremely simple means by virtue of the fact that the housing is composed of housing shells, each of which has a clamping jaw-like part that belongs to a respective housing shell.

The sealing action can be improved with even simpler means by virtue of the fact that an annular shell part, in particular belonging to the housing, is able to act on the hollow connecting piece in the radial direction.

The sealing action can be improved with even simpler, conventional, inexpensive means by virtue of the fact that the annular shell-like part is embodied in the form of a tension sling, in particular a twistable wire and/or pipe clamp and/or cable strap.

BRIEF DESCRIPTION OF THE DRAWINGS

The invention will be explained below in conjunction with an exemplary embodiment and associated drawings.

DESCRIPTION OF THE PREFERRED EMBODIMENTS

Figure 1:
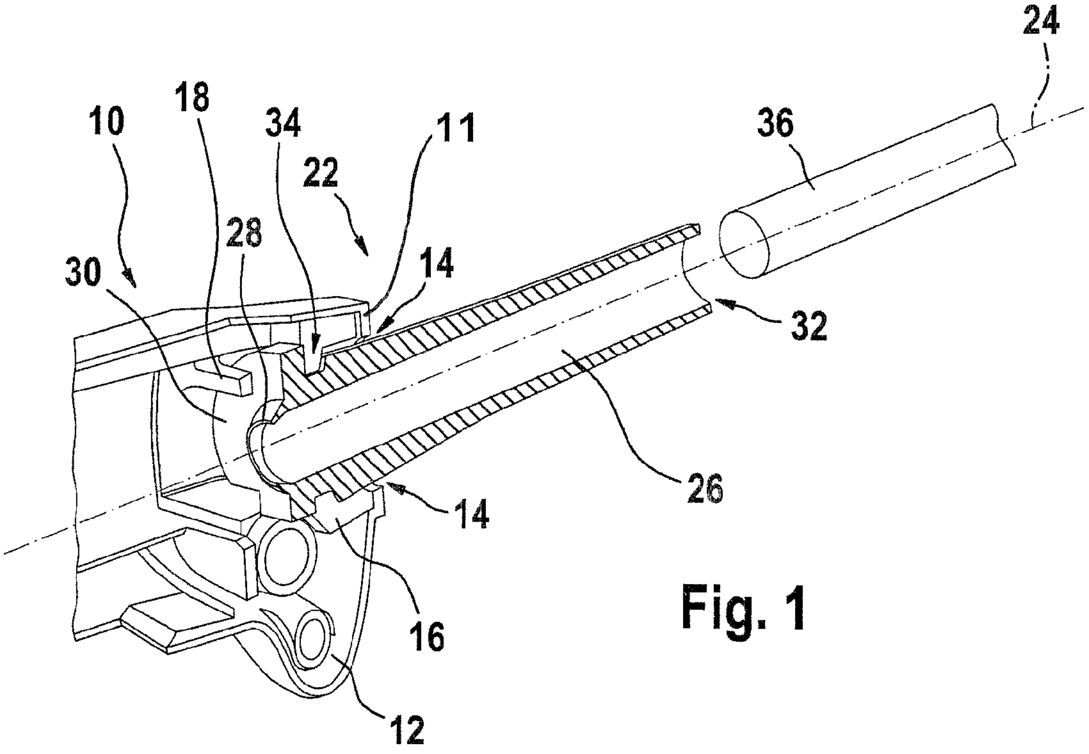
FIG. 1 shows a longitudinal sections through a hand-held power tool housing equipped with the cable and cable sleeve according to the invention.
Figure 2:
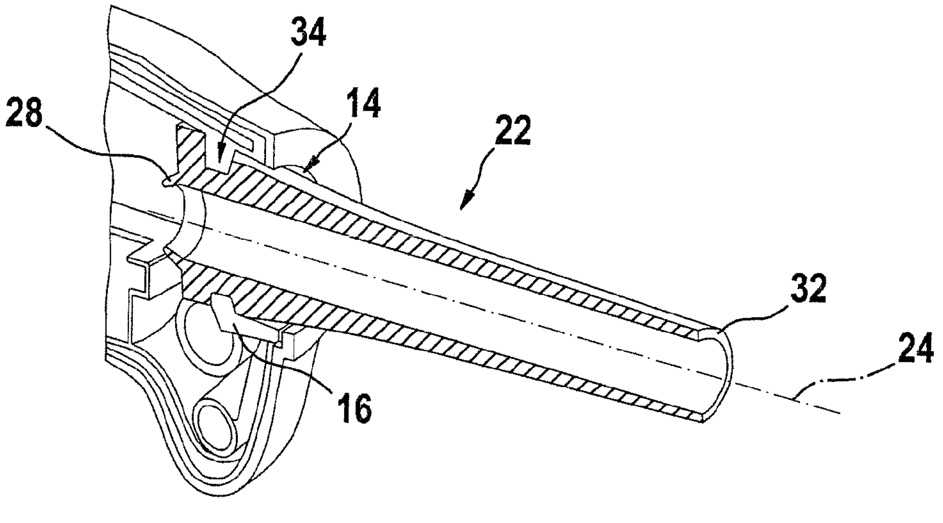
FIG. 2 shows another longitudinal section through the hand-held power tool housing equipped with the cable and cable sleeve according to the invention.
Figure 3:
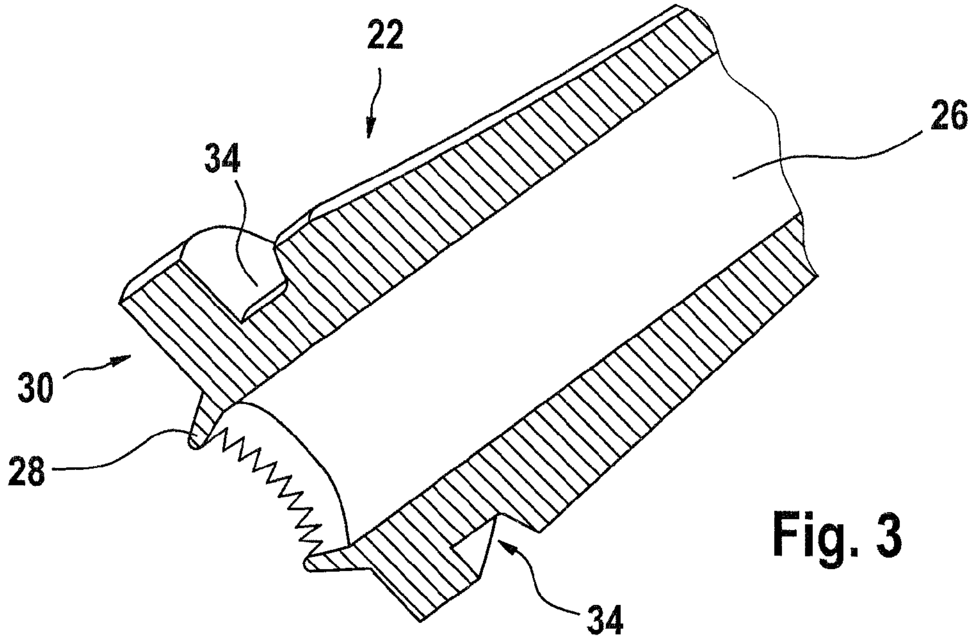
FIG. 3 shows the cable sleeve according to FIGS. 1 and 2, in a longitudinal section through a detail.

At its front end 30 situated inside the housing, a cable sleeve 22 depicted in FIGS. 1, 2, and 3 has an annular, circumferential, inward-oriented radial sealing lip 28 that encompasses a cable, which is pulled into it, in an elastically pressing and therefore axially sealed fashion; the hollow cylinder 26 has a conical wall that becomes thinner toward its end 32, which encompasses the cable 36 and shields it from the outside. The significantly thicker wall region in the vicinity of the front end 30 absorbs a greater bending moment than closer to the end 32 and therefore in the event of powerful bending forces acting on the cable 36, prevents a sharp bending of the cable 36 relative to the longitudinal axis 24 of the housing 10, i.e. by an acute angle of approximately 90° with a minimal bending radius, and thus also prevents breakage of the cable strands inside the cable 36.

On the outside, the cable sleeve 22 is conventionally embodied and can be fixed in position by means of an external annular groove 34, which is associated with a matching annular projection 16 of the housing 10, and by means of its front end 30, which is associated with a rib-like axial stop 18 of the housing 10. The housing wall 11 of housing 10 constitutes a cable sleeve outlet opening 14, which encompasses the cable sleeve 22 through which the cable sleeve 22 protrudes outward, and as it does so, conveys the cable 36 to the inside.

The sealing, insertion, and withdrawal properties of the cable in relation to the cable sleeve 22 can be selected through the embodiment of the sleeve's angle in the region of the sealing lip. If the sealing lip 28, as depicted in FIG. 3, has a saw-tooth structure, it is safe to assume that the cable sleeve 22 has a relatively low, assembly-friendly cable pull-in force as compared to a higher pull-out force. This facilitates strain relief. To this end, it is also possible to provide corresponding grooves or cams on the cable 36.

Figure 4:
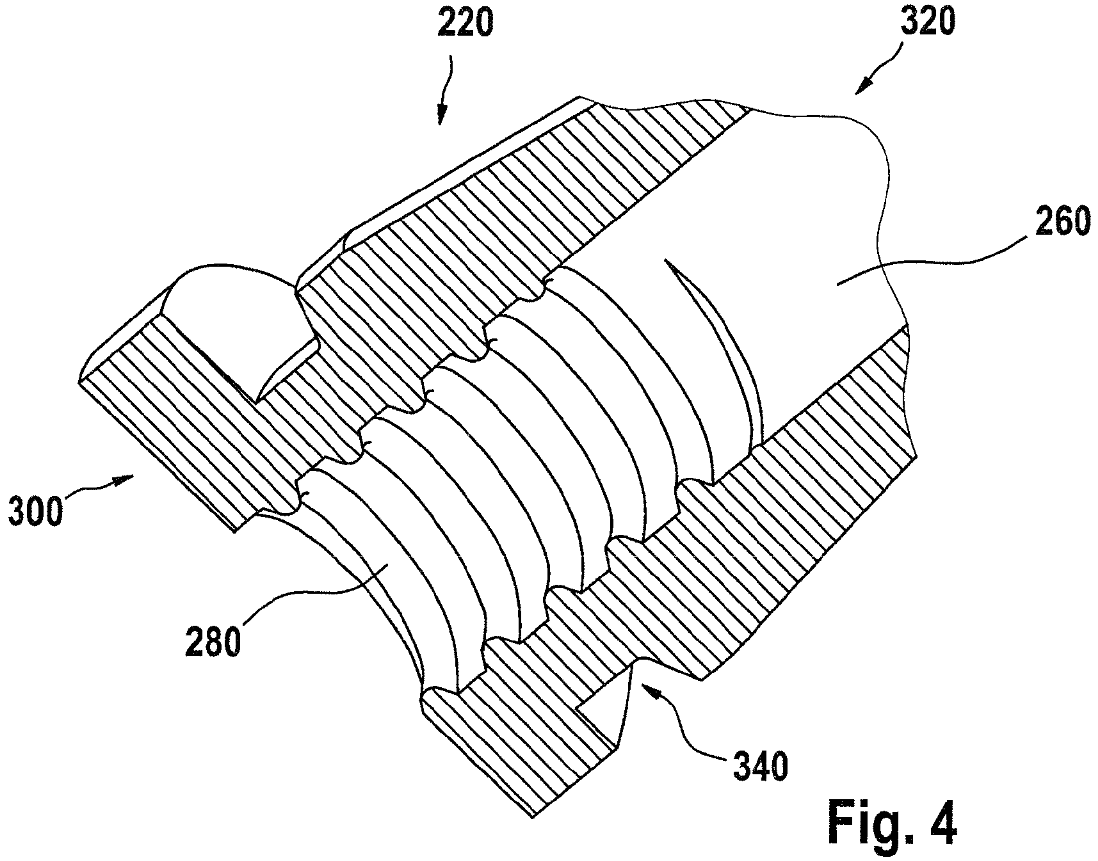
FIG. 4 shows another cable sleeve with a helical radial inner sealing lip, FIGS. 5 and 6 each show a variant of the cable sleeve with a plurality of radial inner sealing lips.

FIG. 4 shows a cable sleeve 220 having a front end 300 and an end 320. The cable sleeve 220 is provided with a helical inward-oriented radial sealing lip 280 that can have a stepped inner diameter for a use with cables of different diameters. In this connection, when the cable sleeve 220 is used for large cable diameters, sealing lips that are too tight can be removed mechanically or thermally or in some other way. According to this principle, the cable 36 is screwed into the cable sleeve 220 like a screw into the thread of a nut. In this case, it is possible for a cable sleeve 220 that is manufactured in one piece to have material combinations between the conventional sleeve region and the sealing region.

In a variant of the cable sleeve 220 with a helical, stepped sealing lip, closer to a more elastic or more stretchable region of the hollow cylinder 260, it is not necessary to remove excessively large sealing lips because they are able to move radially out of the way along with the hollow cylinder 260 and its wall.

Figure 5:
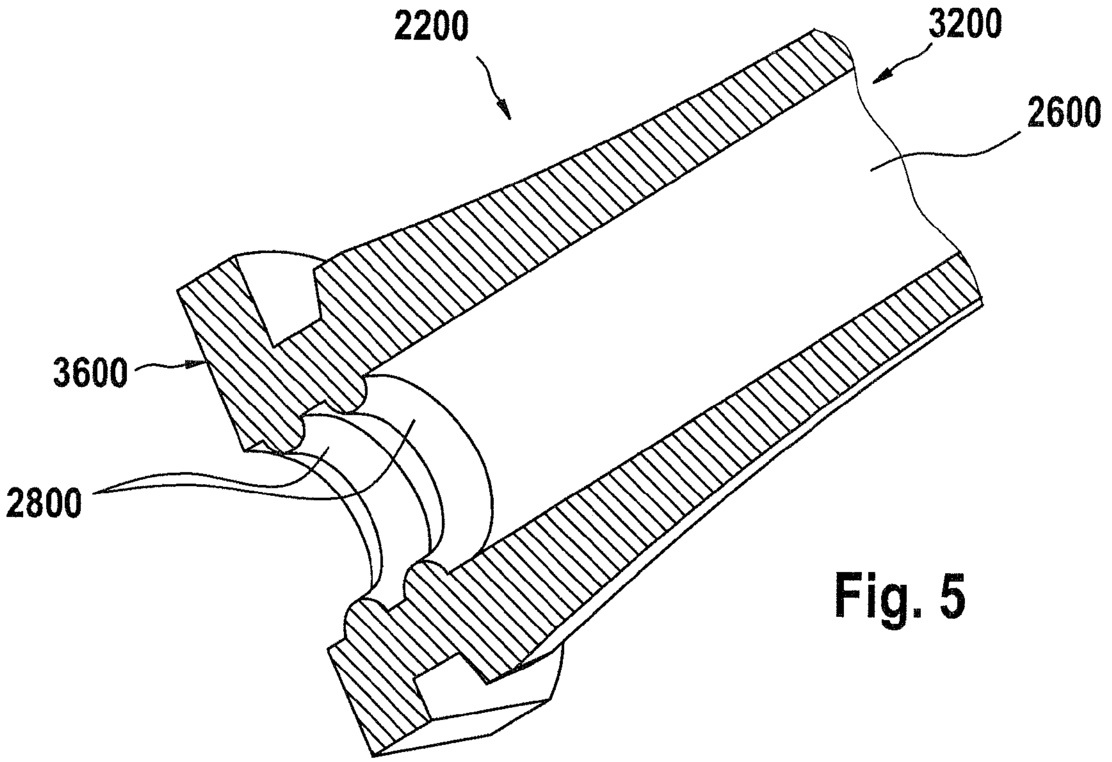
Figure 6:
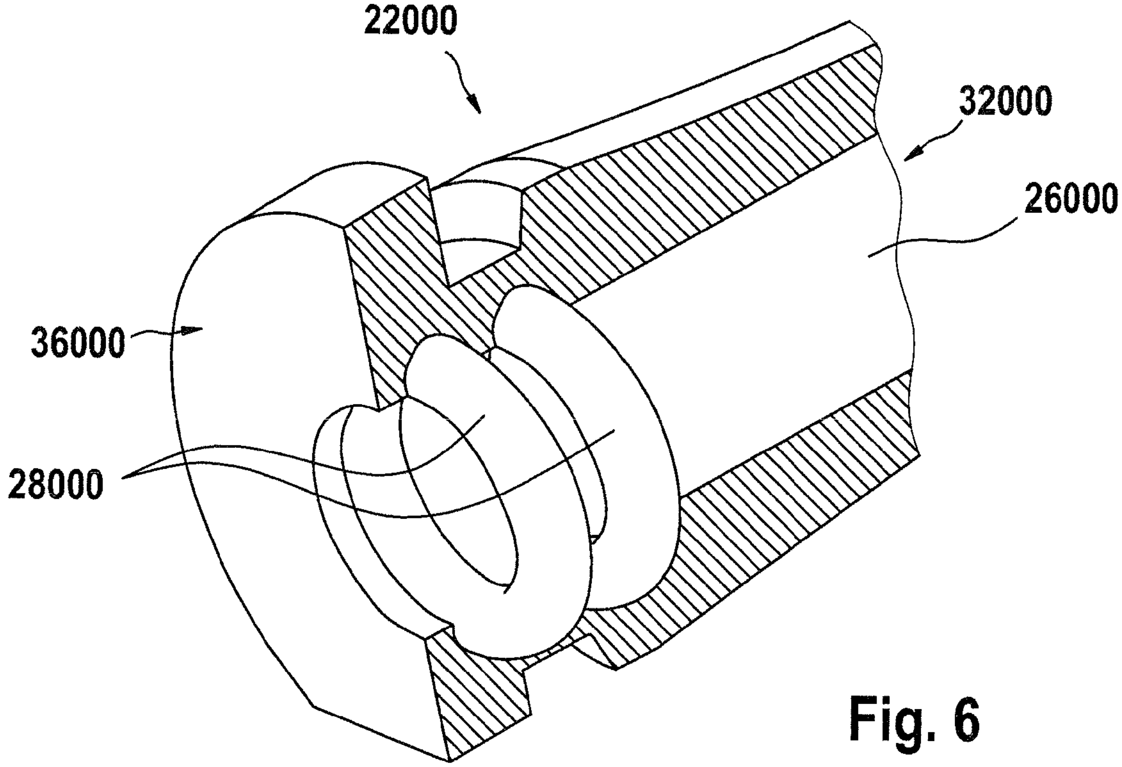

The cable sleeves 2200, 22000 shown in FIGS. 5 and 6 each have two parallel, radial, inner sealing lips 2800, 28000 constituted by integrated annular beads or O-rings composed of a material that is the same as or different from the material of the respective cable sleeve. Like the helical sealing lip according to FIG. 4, these can each have a different respective inner diameter for different thicknesses of cable; for thicker cables, excessively tight sealing lips can be removed mechanically or thermally or in some other way. A cable that has been pulled in is elastically enclosed in a sealed fashion in accordance with the active principle of an O-ring. Other shapes of the annular bead—e.g. rectangular, square, or elliptical—and/or other materials of a one-piece cable sleeve for the conventional sleeve region and the sealing region are also conceivable.

The advantage of this variant is the ability to select a suitable size of the O-rings; it is also possible to select from a broad range of materials for the sealing means. In these cable sleeves, it is also advantageous for the sealing cross-sections to be embodied as rectangular, square, elliptical, saw-toothed, etc.

Figure 7:
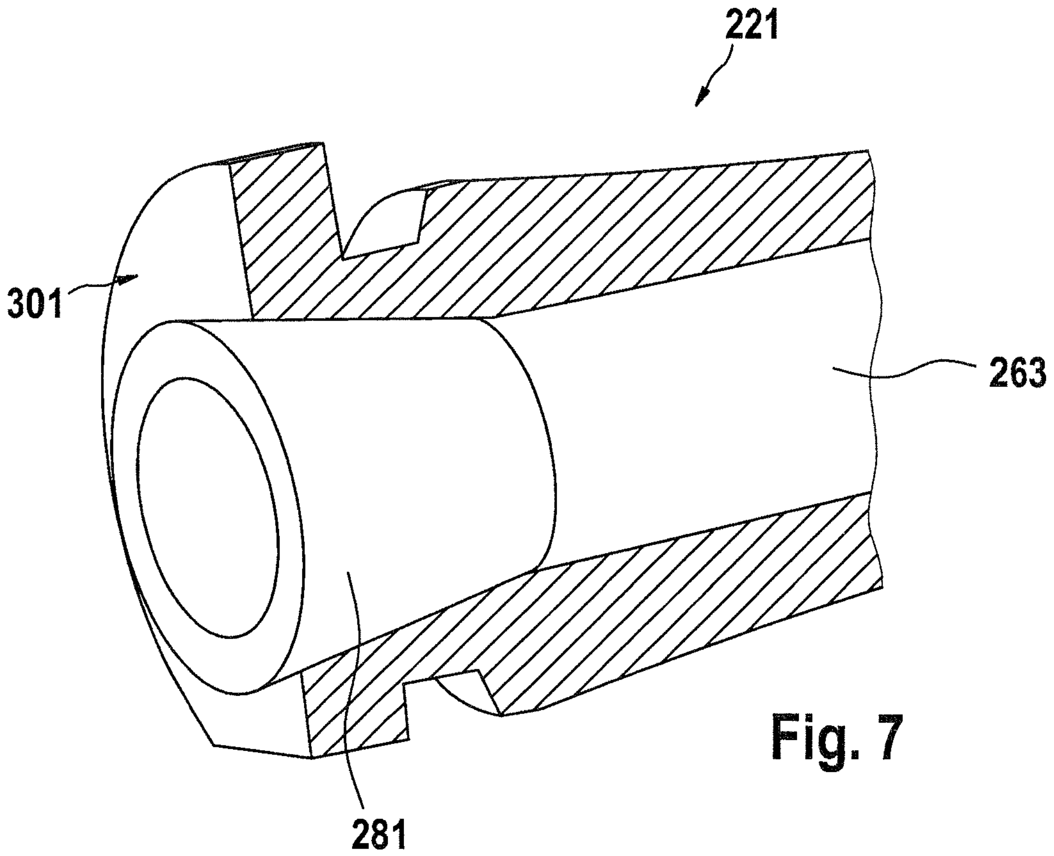
FIG. 7 shows a cable sleeve with a hollow, cylindrical plug as a sealing means.

The front end 301 of the cable sleeve 221 shown in FIG. 7 has an elastic, hollow, cylindrical wedge element 281 that is pressed into the inside of the hollow cylinder 263 of the cable sleeve 221 and correspondingly fixed in place, e.g. by means of frictional, nonpositive engagement, a mechanical undercut, a rib on the housing, or glue. The pressing action slides the wedge element in a sealed fashion into the pre-existing gap between the cable sleeve and the cable, not shown. Another variant of a cable sleeve manufactured of one piece in accordance with the design shown in FIG. 7, equipped with an integrated cone, is not shown in the drawing.

Figure 8:
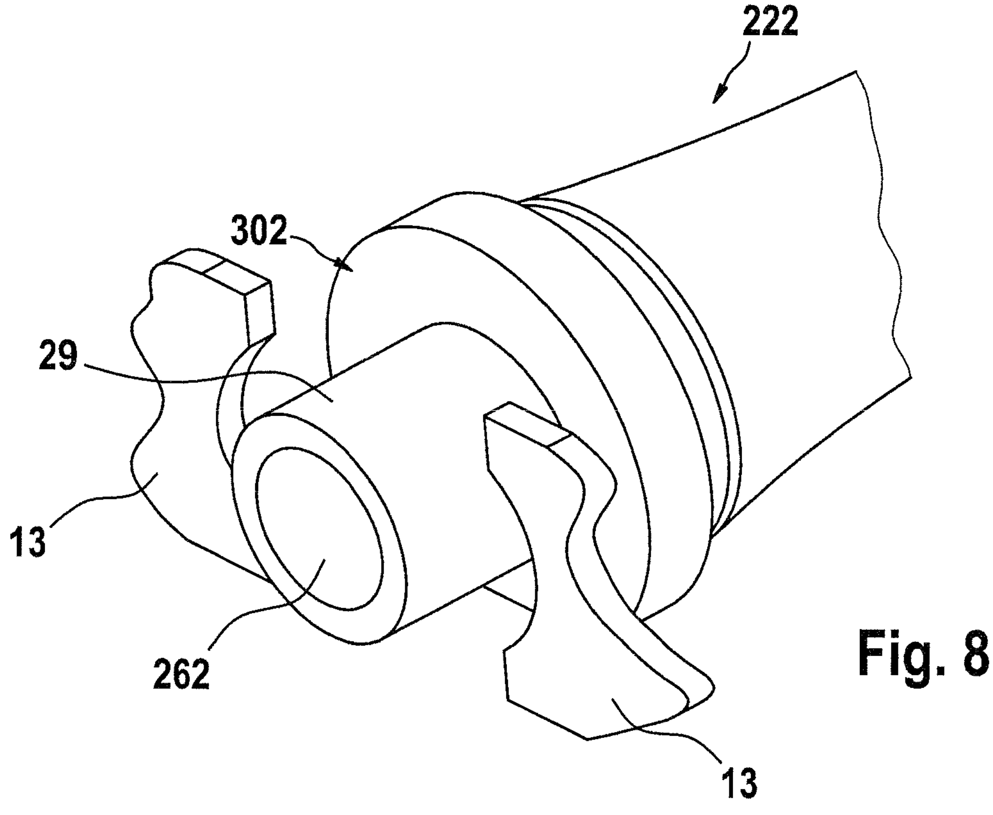
FIG. 8 shows a cable sleeve with a crushing region, which, acting as a sealing means, is acted on by clamping jaws.

The front end 302 of the cable sleeve 222 shown in FIG. 8 has a protruding region 29 similar to a pipe-connecting piece, with a narrow wall thickness. This region 29 performs its sealing function in relation to an inserted cable once a radial force is exerted on it from the outside. For this purpose, opposing ribs 13 are integrated into the two shells 12 (one shell 12 is shown in FIG. 1) of the housing 10 and when the shells 12 are assembled, act on the region 13 from the outside like a pair of pliers, deforming it in a cross-sectionally constricting fashion, producing a seal in relation to the inserted cable. Alternatively, it is also possible for a plurality of ribs to be arranged one after another and laterally offset from one another, from the one shell to the other shell. By means of this measure, the additional deformation of the power cord could function like a strain-relief element.

Figure 9:
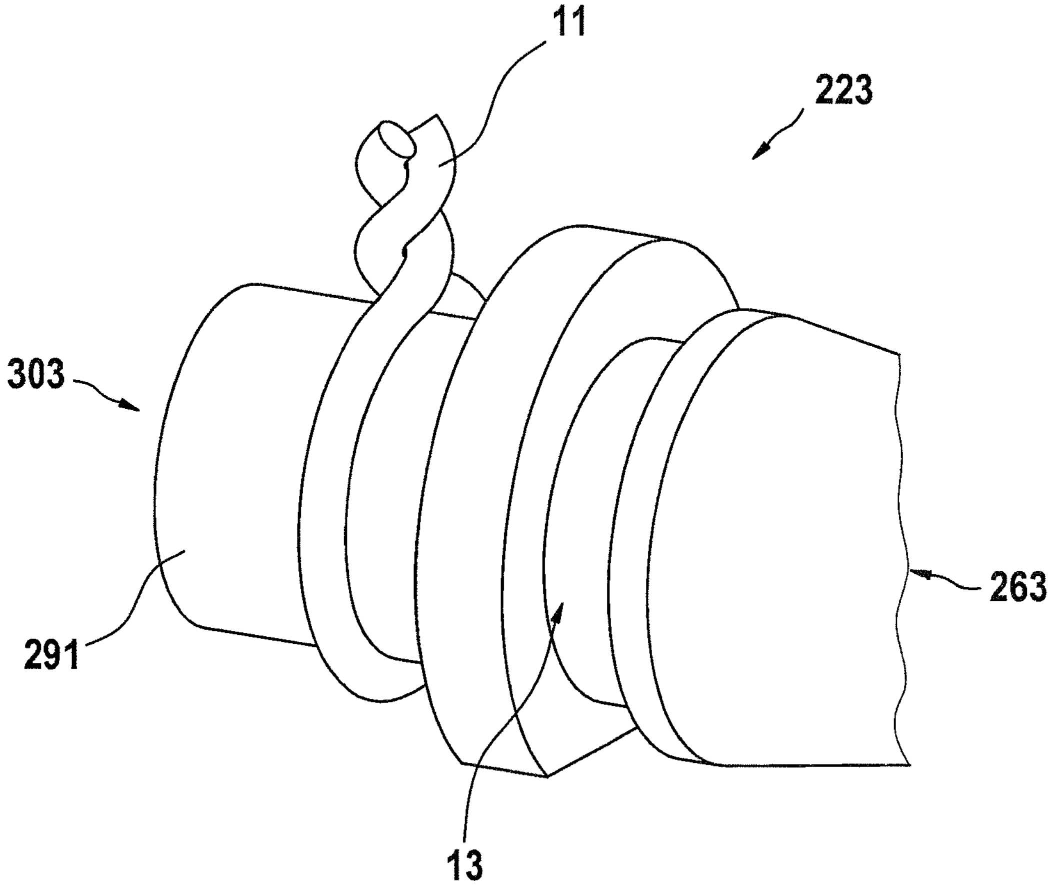
FIG. 9 shows a cable sleeve with a crushing region, which, acting as a sealing means, is acted on by an annular bracket-like sleeve.

The front end 303 of the cable sleeve 223 shown in FIG. 9 has a protruding region 291 similar to a pipe connecting piece, with a narrow wall thickness like the cable sleeve according to FIG. 8. This region 291 performs its sealing function in relation to an inserted cable once a radial force is exerted on it from the outside. For this purpose, a crushing element 11 is provided, which acts on the region 13 from the outside, deforming it in a cross-sectionally constricting fashion, producing a seal in relation to an inserted cable. The crushing element can, for example, be a twistable wire, pipe clamp, cable strap, or similar device. According to this principle, the seal is achieved by compressing and constricting the sleeve from the outside in the direction toward the power cord. Another advantage is the possibility of prefabricating the combined unit composed of the sleeve and cable.

Furthermore, gluing the cable sleeve to the cable would produce a sealed, strain-relieving cable inlet. Filling the intermediate space between the cable sleeve and cable with a corresponding foam material is also a conceivable way to achieve a durable, sealed connection. As another variant, a cable sleeve that is vulcanized onto the cable is provided and/or the cable sleeve is injection molded around the cable and/or the cable sleeve is embodied in the form of an elastic shrink sleeve.

The above-mentioned cable sleeve principles can be partially combined with one another. This yields additional variants. Corresponding sealing means can be situated in the hollow cylinder 26 over the entire length of the cable sleeve and embodied in accordance with the production process and assembly process.

In other variants, the cable sleeves can also be embodied of multiple parts or in the form of shells in order to facilitate assembly.

The foregoing relates to the preferred exemplary embodiments of the invention, it being understood that other variants and embodiments thereof are possible within the spirit and scope of the invention, the latter being defined by the appended claims.

The invention claimed is:

1. A cable sleeve for guiding a cable in an inlet and outlet region of a hand-held power tool housing, the housing including a wall including an exterior surface defining an exterior of the power tool housing and an interior surface defining an interior of the power tool housing, and a projection formed as part of the housing in the interior, spaced from the interior surface and defining a space therebetween, wherein the housing includes a stop disposed in the interior of the housing and spaced at a distance from the interior surface greater than the distance the projection is spaced from the interior surface, an end of the cable sleeve including a conical wall and a groove, the groove being disposed along the conical wall and being oriented toward the housing, the groove engaging the projection such that the cable sleeve is connected to the housing in a fixable manner, particularly in a form-locked manner, the cable sleeve having a radial sealing element in contact with the cable in a sealed fashion, wherein the conical wall includes a first portion disposed between the stop and the projection on one side of the groove and having a thicker wall region than a second portion disposed on another side of the groove and disposed between the projection and the interior wall, wherein the first portion terminates the cables sleeve and includes a front end surface facing the stop.

2. The cable sleeve as recited in claim 1, wherein the cable sleeve encompasses the cable in a radially sealed, frictional, nonpositive fashion.

3. The cable sleeve as recited in claim 2, wherein the at the end of the cable sleeve oriented toward the housing, the cable sleeve has a ring-like sealing element that rests in a sealed fashion against an outer circumference of the cable.

4. The cable sleeve as recited in claim 1, wherein the cable sleeve is provided with a helical inward-oriented radial sealing lip.

5. The cable sleeve as recited in claim 2, wherein the cable sleeve is provided with a helical inward-oriented radial sealing lip.

6. The cable sleeve as recited in claim 3, wherein the cable sleeve is provided with a helical inward-oriented radial sealing lip.

7. The cable sleeve as recited in claim 3, wherein the cable sleeve has a plurality of ring-like sealing elements at the end of the cable sleeve oriented toward the housing.

8. The cable sleeve as recited in claim 7, wherein the ring-like sealing elements are embodied in the form of an annular bead, particularly in the form of injection-molded O-rings composed of a material that differs from a material of the sleeve, which has softer elastic properties than the material of the sleeve.

9. The cable sleeve as recited in claim 3, wherein the ring-like sealing element is embodied in the form of a hollow cylindrical plug, in particular a wedge-shaped plug, that protrudes into the hollow cylinder of the cable sleeve, particularly at a front end thereof and wherein the wedge shaped plug comprises an elastic hollow cylindrical wedge element configured to be pressed into the end of the cable sleeve and correspondingly fixed in place by one of frictional, nonpositive engagement, a mechanical undercut, a rib on the housing, and glue.

10. The cable sleeve as recited in claim 1, wherein the cable sleeve protrudes with a smooth, cylindrical, hollow connecting piece into an interior of the housing and in an installed position therein, is encompassed in such that a region of the hollow connecting piece rests in an annular, sealed fashion against an outside of the cable.

11. The cable sleeve as recited in claim 10, wherein the housing includes a plurality of clamping jaw-like parts which are able to act on the hollow connecting piece.

12. The cable sleeve as recited in claim 11, wherein the housing is composed of housing shells, each of which has a clamping jaw-like part of one of the plurality of clamping jaw like parts that belongs to a respective housing shell.

13. The cable sleeve as recited in claim 10, wherein an annular shell part, in particular belonging to the housing, is able to act on the hollow connecting piece in a radial direction.

14. The cable sleeve as recited in claim 13, wherein the annular shell-like part is embodied in the form of a tension sling, in particular one of a twistable wire and a pipe clamp and a cable strap.

15. The cable sleeve as recited in claim 1, wherein the radial sealing element includes a ring-like sealing element that rests in sealed fashion against an outer circumference of the cable.

16. A cable sleeve for guiding a cable through a hand-held power tool housing, the housing including a wall defining a sleeve outlet opening and including an exterior surface defining an exterior of the power tool housing and an interior surface defining an interior of the power tool housing, the housing including a projection disposed in the interior and formed as part of the housing and a stop disposed in the interior of the housing and spaced along the length of the cable sleeve from the projection at a location further from the wall than the projection is spaced from the wall along the length of the cable sleeve, the cable sleeve comprising:

a conical wall and an end portion including a first portion located on one side of a groove and a second portion located on another side of the groove, the second portion disposed adjacently to the wall at the sleeve outlet opening, the groove being located in the interior of the power tool housing and engaging the projection, wherein the groove is configured to engage the housing in a fixable manner at a location other than the sleeve outlet opening, particularly in a form-locked manner, the cable sleeve having a radial sealing element in contact with the cable in a sealed fashion, wherein the first portion includes a thicker wall region than a wall region of the second portion and the first portion terminates the cable sleeve.

17. The cable sleeve as recited in claim 16, wherein an outside of the cable sleeve is tapered along the first portion and the taper diminishes the further the taper extends from the groove toward the sleeve outlet opening.

18. The cable sleeve as recited in claim 17, wherein the first portion of the cable sleeve includes a front end surface facing the stop.

19. The cable sleeve as recited in claim 16, wherein the radial sealing element includes a ring-like sealing element that rests in sealed fashion against an outer circumference of the cable.

* * * * *